UNITED STATES PATENT OFFICE.

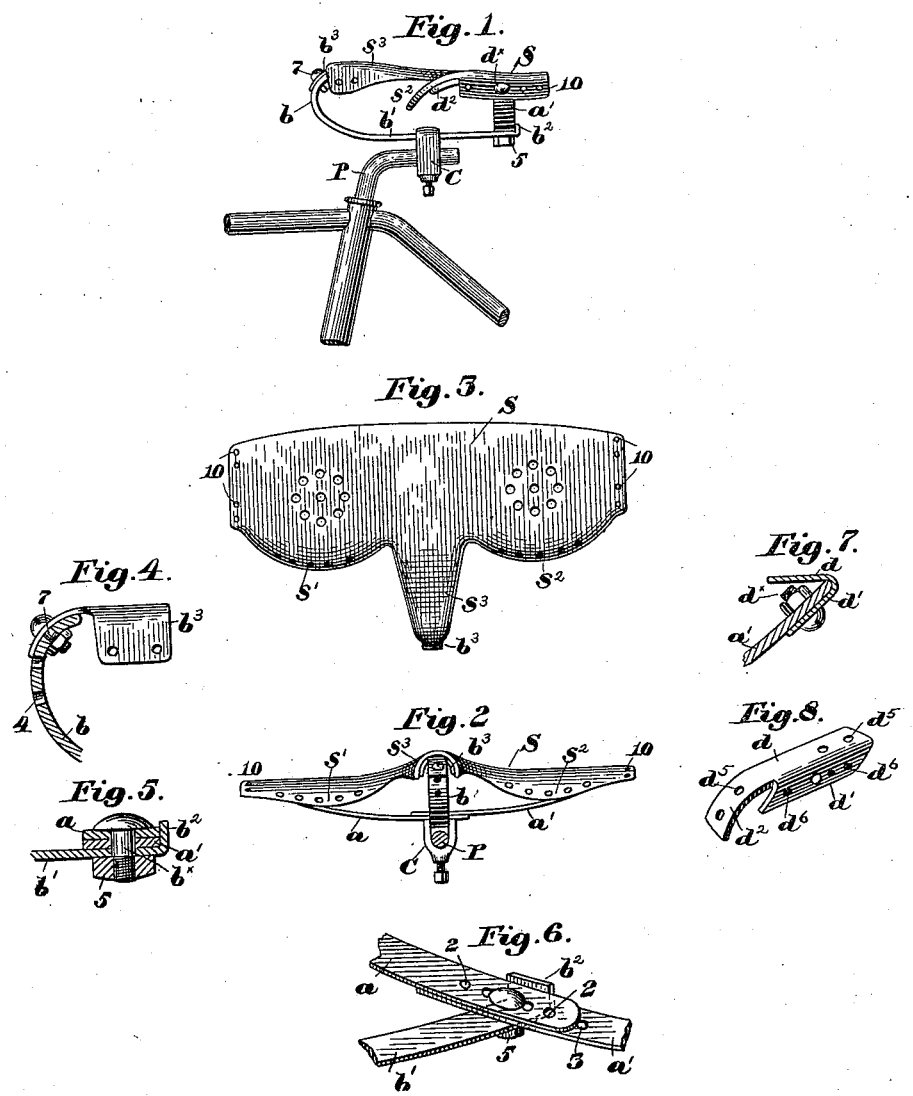

GEORGE O. DRAPER, OF HOPEDALE, MASSACHUSETTS.

TRANSVERSE SEAT FOR FOOT-POWER VEHICLES.

SPECIFICATION forming part of Letters Patent No. 574,673, dated January 5, 1897.

Application filed March 12, 1896. Serial No. 582,895. (No model.)

*To all whom it may concern:*

Be it known that I, GEORGE O. DRAPER, of Hopedale, county of Worcester, State of Massachusetts, have invented an Improvement in Transverse Seats for Foot-Power Vehicles, of which the following description, in connection with the accompanying drawings, is a specification, like letters and numerals on the drawings representing like parts.

This invention has for its object the production of a transverse seat for bicycles or other foot-power vehicles, and is an improvement on the seat forming the subject-matter of United States Patent No. 524,106, granted to me on the 7th day of August, 1894. In said patent, to which reference may be had, the advantages of a transverse seat are fully set forth and need not be herein repeated.

I have found that in actual practice the seat forming the subject-matter of said patent is open to some slight objection, more particularly when first used and before the rider has become fully accustomed thereto, a tendency to slip forward off of the seat being observed, owing to the absence of any positive support at its front edge. To overcome this tendency, I have provided the seat with a horn extended from the center of its front edge, the horn being sustained by a resilient support, so that while the flexibility and other advantages of the transverse seat are retained a support of a positive nature is also provided for its central front portion.

In the construction hereinafter described I preserve one of the leading features of my patented seat referred to—viz., having all the points of support for the seat outside the limits touched by the person of the rider, so that no rigid or metallic part comes in near proximity to the rider.

Figure 1 is a side elevation of a seat embodying my invention, the seat-post and part of the frame of a bicycle being shown. Fig. 2 is a front view thereof. Fig. 3 is a top or plan view of the seat. Fig. 4 is a detail, partly in section, of the resilient horn-support. Figs. 5 and 6 are details of the connection between the transverse frames and horn-support. Fig. 7 is a sectional detail showing the manner of attaching the side support to one of the transverse frames, and Fig. 8 is a perspective view of one of the side supports to be described.

At each end of the frame $a\ a'$ I secure seat-supports, shown herein as pieces of metal $d$, bent over at $d'$ and connected by a bolt $d^\times$ to the adjacent arm of said frame, as shown in Fig. 7, the top portion of the support being extended forward and curved downward, as at $d^2$, Figs. 1 and 8, to incline the front edge of the seat, as clearly shown in Fig. 1.

The seat portion S, of leather or other suitable flexible material, is secured at its ends to the supports $d$ by suitable rivets 10, passed through holes $d^5\ d^6$ in the tops and outer sides of said supports, and tightly stretched and suspended between them by proper lateral adjustment of the frame members $a\ a'$.

As in the patent hereinbefore referred to, the front edge of the seat is formed with two independent flaps or projecting portions $s'\ s^2$, but herein they are separated by a forwardly-projecting portion or horn $s^3$, the outer end or tip thereof being bent around and secured in suitable manner to the convexed holder $b^3$.

The seat proper is mounted on a support comprising a transverse frame $a\ a'$ and a horn-support $b$, the latter being shown in Figs. 1 and 2 as secured by a clamp C to the usual seat-post P, the upturned curved metal arms $a\ a'$ extending across the longitudinal axis of the vehicle and the support $b$ in the plane of such axis.

As shown in Figs. 5 and 6, the support $b$ is bent to form a flattened portion or foot $b'$, upturned at $b^2$, and the overlapped inner ends of $a$ and $a'$ are held in place on said foot and against the lug $b^2$ by a suitable bolt $b^\times$, extended through the foot $b'$ and held securely by a nut 5.

In order to adjust the transverse frame $a\ a'$, the inner ends of its members are provided with a plurality of holes 2 3, through one or other of which the bolt $b^\times$ is passed.

The upwardly-curved end of the support $b$, which is of suitable resilient material, as spring-steel, is provided with one or more holes 4 to receive a bolt 7, by means of which a transversely-convexed holder $b^8$ is secured thereto, the tip or outer end of the horn, to be described, being drawn over and secured to the holder.

The flaps $s'$ $s^2$ yield to the pressure of the legs and prevent chafing, the bent portions $d^2$ of the supports $d$ assisting, and the horn $s^3$ holds the center of the seat up and prevents sagging. Moreover, the horn overcomes any tendency of the rider to pitch forward or slide off the seat, while the resiliency of the horn-support $b$ prevents any stiffness or rigidity in the seat.

In my patent referred to the tight stretching of the seat had to be continuously maintained in order to prevent central sagging, but I am not obliged to maintain the seat so tightly stretched herein, owing to the horn and its support.

The tension of the horn $s^3$ may be regulated by adjustment of the holder $b^3$ on the support $b$, the holder by its convex form serving to suitably shape the horn, and the seat is suspended from three points.

By the construction herein shown I obtain all the advantageous features of a transverse and a fore-and-aft seat without the main objections of either form of seat.

Having fully described my invention, what I claim, and desire to secure by Letters Patent, is—

1. In a saddle, a curved transverse frame, an upturned resilient support secured to and upturned in front of said frame, and a flexible seat having a horn and lateral portions at the side of the horn, said seat being stretched between the ends of the frame and the resilient support, substantially as described.

2. In a saddle, an upwardly-curved laterally-adjustable transverse frame, a resilient support upturned in front of said frame, and a seat of flexible material having three points of attachment, to the ends of the frame and the support respectively, and suspended therefrom, substantially as described.

3. In a saddle, a curved transverse frame, a horn-support upturned in front thereof, side supports secured to the ends of the frame and curved transversely thereto, a flexible seat attached to the side supports and stretched therebetween, the front edge of the seat being shaped to present a central horn secured at its tip to the horn-support, substantially as described.

4. A flexible transverse seat for foot-power vehicles, shaped at its front edge to present a central projecting horn and a flap or projection at each side thereof, means to support the tip of the horn, and side supports for the seat, curved forward and downward beneath the outer portions of the flaps or projections, substantially as described.

In testimony whereof I have signed my name to this specification in the presence of two subscribing witnesses.

GEORGE O. DRAPER.

Witnesses:
FRANK J. DUTCHER,
C. N. NICHOLS.